Patented Oct. 26, 1943

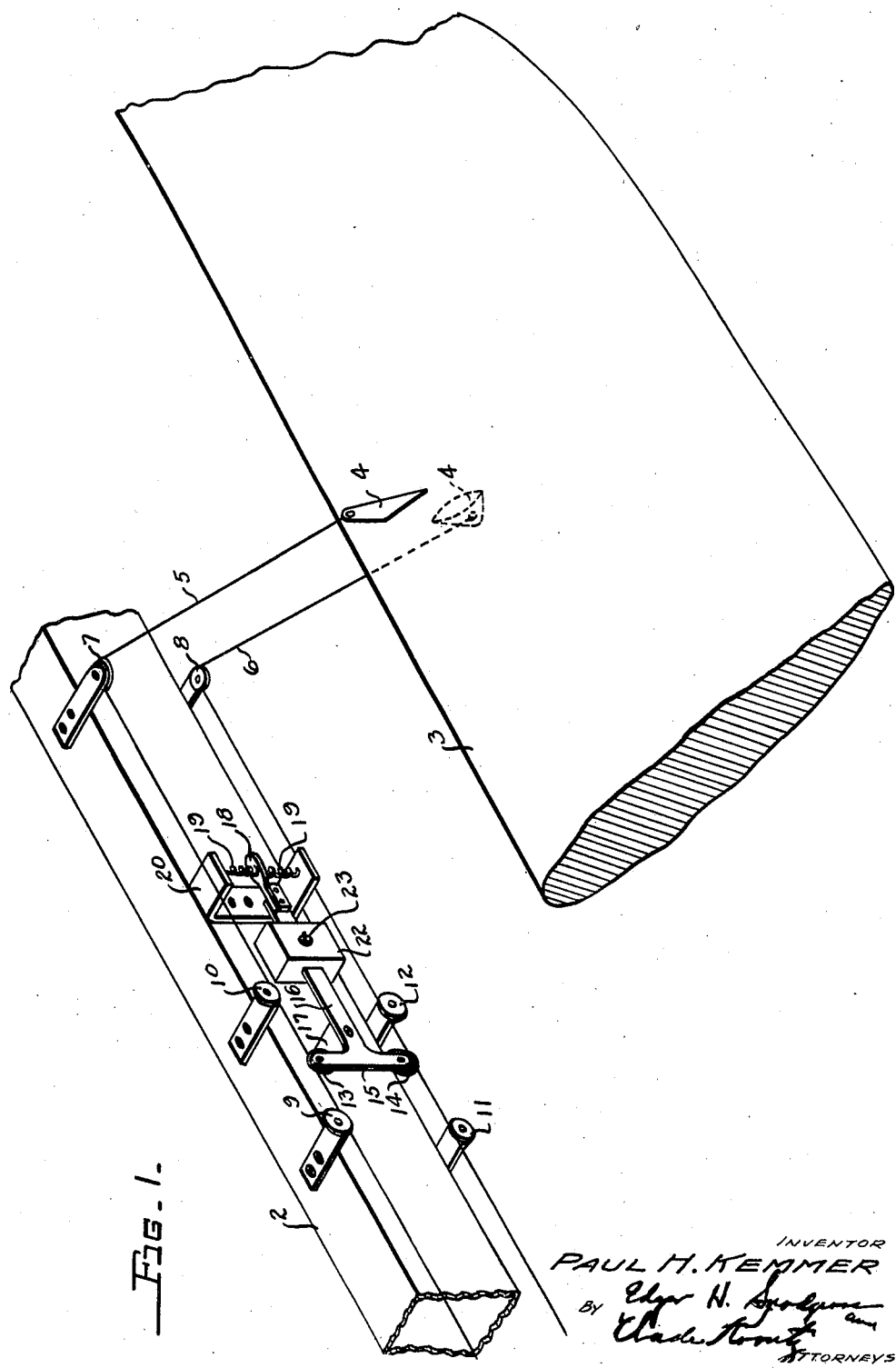

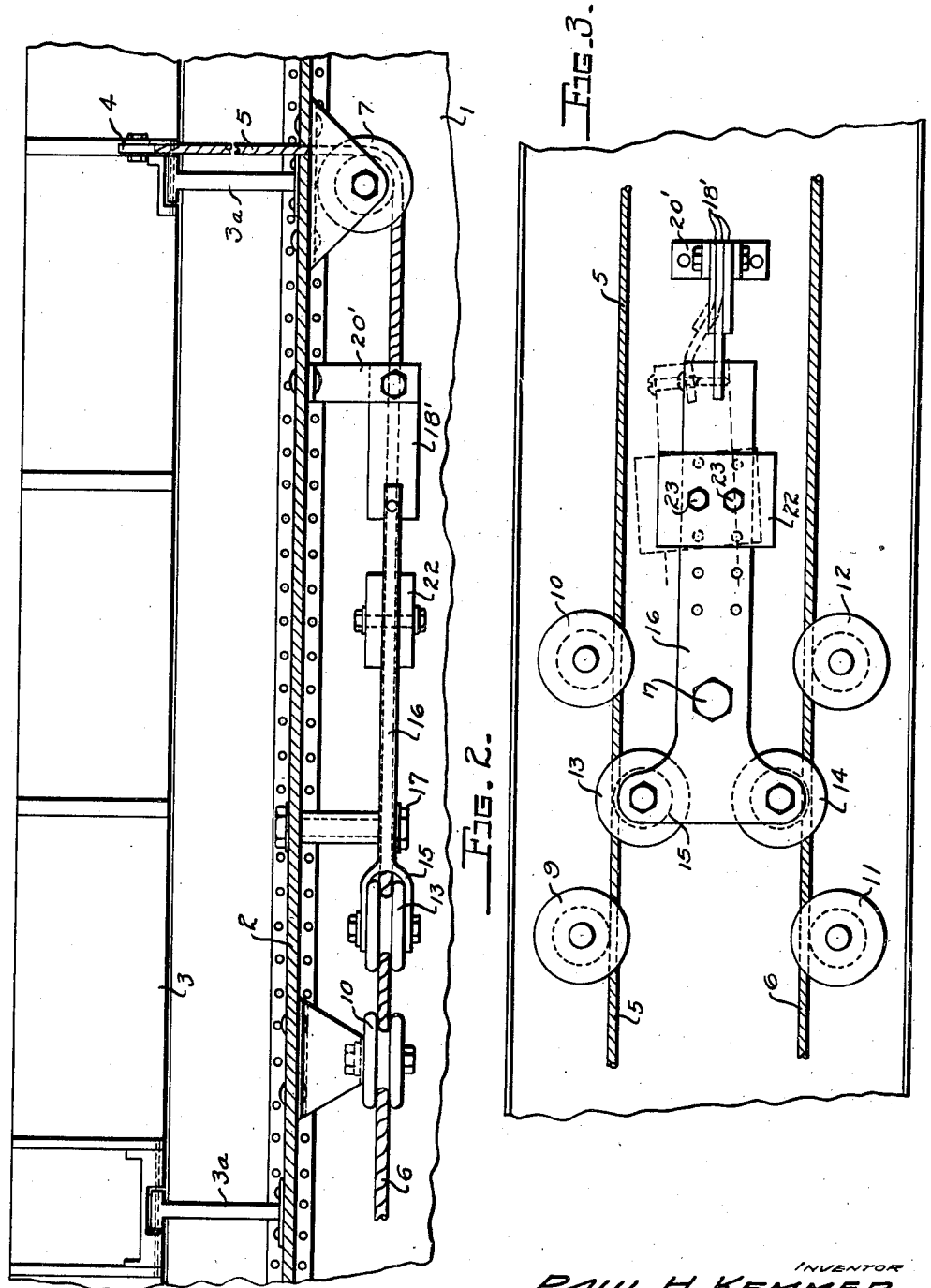

2,332,516

UNITED STATES PATENT OFFICE 2,332,516

FLUTTER AND VIBRATION PREVENTION DEVICE FOR CONTROL SURFACES

Paul H. Kemmer, Fairfield, Ohio

Application August 12, 1940, Serial No. 352,268

6 Claims. (Cl. 244—75)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to devices for preventing flutter and vibration in aircraft control surfaces such as ailerons, elevators, rudders, flaps and the like and, more particularly, the device in accordance with the invention consists of means for producing a vibratory force having a frequency equal to the natural frequency of vibration of the associated control surface or the like and out of phase with the vibration forces acting on the said surface, so that the primary vibrations are completely damped out, or damped to such an extent in their incipient stages, that the amplitude of the primary vibrations cannot build up to a dangerous degree.

The use of a secondary vibratory system including a mass and a resilient element such as a spring tuned to respond to the natural vibration frequency of a primary vibrating system such as a ship, an aircraft or other vehicle and so arranged that the secondary vibrations are out of phase with the primary vibrations to thereby damp out the primary vibrations or minimize their effects, has long been known in the art as evidenced by the United States Patent No. 989,958 granted to Hermann Frahm. The application of the "Frahm" system to a fixed surface of an aircraft is disclosed in the United States Patent No. 2,038,603 granted to Jean A. Roche. Each of the above noted devices, however, illustrate vibration dampers or stop-flutter devices secured directly to the primary vibrating body to damp the vibrations therein. In the vast majority of aircraft in which dangerous flutter has developed, the flutter has been found primarily to be induced by flutter in pivoted control surfaces. The vibration in the control surfaces builds up in amplitude and is transmitted also into the adjacent structure such as the wing and horizontal stabilizer, causing not only failure of the control surface, but of the main supporting surface as well. It is extremely difficult to apply a vibration damper of the type disclosed in the above-noted patents, to a movable surface of an aircraft due to the limited space available for installation, also the vibration damper cannot be shielded from the air stream which can exert undesirable forces on the damping device, as well as create objectionable drag forces. This problem, however, is solved in accordance with the invention by mounting the vibration damper, preferably of the Frahm type, within the wing or other portion of the aircraft so that the damper is not exposed to the air stream. The vibration damper is then connected to the movable surface through links or cables and associated mechanism, such that secondary vibrations set up in the vibration damper are transmitted to the movable surface, out of phase with the primary vibrations therein, thereby eliminating the possibility of dangerous flutter arising in the movable surface.

The control system associated with the movable control surfaces of an aircraft form a convenient means for transmitting the damping forces to the associated control surface and form the preferred means for connecting the vibration damper to its associated control surface, though it is understood that equivalent forms of connections not associated with the control system may be used.

The principal object of the invention is the provision in combination with a flap or movable control surface of an aircraft, of a vibration damper comprising a resiliently mounted mass having a period of vibration substantially equal to the natural period of vibration of the associated control surface and means for transmitting the vibrations of said mass to said surface out of phase with the primary vibrations of said surface.

A further object of the invention is the provision in a vibration damping system of the type described of a means to tune the oscillation frequency of the resiliently mounted mass to a predetermined frequency.

Another object of the invention is the provision in a vibration damping system of the type described, of a connection between the vibration damper and the movable surface which includes the means for actuating the movable surface.

Other objects of the invention not specifically enumerated above will appear by reference to the detailed description in the specification in conjunction with the appended drawings in which:

Figure 1 is an isometric view of one form of vibration damper employing a coil spring in combination with a movable surface of an aircraft and the control system therefor;

Figure 2 illustrates a plan view partly in section illustrating a vibration damping system similar to the device of Figure 1 except that a leaf spring is employed for resiliently mounting the vibration damping mass, and Figure 3 is a front elevation of the device of Figure 2.

Referring to Figure 1, the reference numeral 2 indicates the rear spar of a conventional airplane wing having associated therewith a hinged aileron 3, provided with the conventional cable control horns 4. The aileron 3 is adapted to be actuated in either direction by means of conventional aileron control cables 5 and 6, which are respectively attached at their outer ends to the upper and lower control horns 4. The cables 5 and 6 pass over guide pulleys 7 and 8, respectively, suitably supported on brackets attached to the spar 2. The cables 5 and 6 then extend inwardly, parallel to the spar 2, and are adapted to be differentially connected to a similar aileron and to a control system (not shown). The upper cable 5 passes over a pair of spaced guide pulleys 9 and 10, and the lower cable 6 similarly passes over a pair of spaced guide pulleys 11 and 12, these guide pulleys being suitably supported for rotation by means of brackets secured to the spar 2. Between the guide pulleys 9 and 10, the upper cable 5 is contacted by a pulley 13 mounted on an upper end of the vertical arm 15, formed as an integral part of a lever 16 at the inner end thereof. The lower cable 6 is similarly contacted between the guide pulleys 11 and 12, by a pulley 14 mounted on the lower end of the arm 15. The lever 16 is pivotally mounted, intermediate its ends, on a support 17 secured to the spar 2. The arm 15 extends at right angles to the lever 16, to the left of the pivotal support 17, as seen in Figure 1. At its outer end, the lever 16 is provided with a spring seat 18, adapted to engage a pair of coil compression springs 19, supported by a bracket 20 from the spar 2.

A mass 22 formed of lead, or other suitable dense material, is slidably mounted on the lever 16 between the pivot 17 and the springs 19. The mass 22 is provided with an adjustable locking screw 23 which permits the mass 22 to be axially adjusted into a desired position on the lever 16, and there retained by means of the locking screw 23.

*Operation*

The operation of the device in Figure 1 in damping vibrations of the aileron 3 is as follows:

The natural period of vibration of the aileron 3 is determined by any of the well-known methods, such as vibrating the surface 3, while the same is covered with sand, and measuring the distance between the nodes apparent from the sand patterns, thereby determining the frequency, or by any other suitable method. Having determined the natural period of vibration of the movable surface 3, the scale of the springs 19 and the mass 22 are then designed such that the natural period of vibration of the mass 22 in conjunction with the resilient springs 19 is substantially equal to the natural period of vibration of the aileron or other movable surface 3. The adjustment of the weight 22 may then be made so as to tune the vibration damper to the exact frequency of the surface 3.

It will be seen that if the aileron 3 is moved upward due to induced vibration, the aileron will tend to rotate about its hinged axis in a counterclockwise direction as seen in Figure 1, thus tending to slacken cable 5 and to elongate cable 6.

Whenever the aileron surface 3 is vibrated, either due to engine vibration or to fluctuating aerodynamic forces, the vibrations will be transmitted into the wing structure adjacent to the aileron, thus inducing secondary vibration of the mass 22, in resonance with the vibration of the aileron, so that the mass 22 will also be moving upward or in a clockwise direction about its pivot 17, as seen in Figure 1, simultaneously with the upward movement of aileron 3.

The rotation of the arm 16 due to the upward movement of the mass 22 causes the pulley 14 to push downward on the cable 6 which, being taut, resists deflection and therefore causes a force to be transmitted from the mass 22 to the lower aileron control horn 4, which force tends to cause the aileron 3 to rotate in a clockwise direction in opposition to the direction of movement caused by the vibration forces acting thereon. The mass 22 and the aileron 3 always vibrate in phase with each other, and the arm 15 and the pulleys 13 and 14 serve as a mechanical phase-shifting device for transmitting the vibratory forces from the mass 22, through the aileron control cables 5 or 6, to the aileron 3 in phase opposition to the vibrations thereof. Clockwise rotation of the arm 16 causes the pulley 13 to apply a force to the upper aileron control cable 5 in the same manner as above described with reference to the pulley 14. The primary function of the vibration damper is to damp the vibrations of the associated control surface in their incipient stages, thereby preventing the amplitude of the oscillation of the said surface from increasing to a dangerous degree. Hence, it is only necessary that the mass 22 be of such dimensions that energy will be continuously discharged from the vibrating system and, hence, needs only to be a small fraction of the mass of the aileron 3.

The vibration damper illustrated in Figure 1 may be applied to other control surfaces such as elevators, rudders and flaps, which are controlled by cables in the same manner as applied to the aileron control system illustrated in Figure 1.

It will be seen by inspection of Figure 1 that the vibration damper, including the mass 22 and its associated structure, may readily be housed within the wing structure so as to be sealed from the surrounding air stream, and further, the vibration damper permits the normal operation of the aileron by the airplane control system without in any way interfering therewith.

Figures 2 and 3 illustrate a slightly modified form of the device of Figure 1 in which, parts similar to the construction of Figure 1 are indicated by the same reference numerals.

The aileron 3 is here shown supported at the rear of a metal wing 1, by means of hinged supports 3a, secured on the rear side of the metal spar 2. The vibration damper is arranged on the front side of the metal spar 2 and is generally similar to the device illustrated in Figure 1, except that the coil compression springs of the device of Figure 1 are replaced by a single leaf type spring 18', suitably mounted on the spar 2 by means of the brackets 20'. The mass 22 is adapted to be adjusted in the same manner as illustrated in Figure 1. The oscillations of the mass 22 are illustrated, though, to a greatly exaggerated scale by means of the dotted lines in Figure 3. The operation of the vibration damper in conjunction with the aileron 3, control horns 4 and aileron control cables 5 and 6 is exactly the same as previously discussed with reference to Figure 1.

While Figures 1 to 3, inclusive, illustrate the application of the invention to ailerons, it is obvious that the vibration damper may be applied in a similar manner to other hinged control surfaces or flaps associated with aircraft. It is therefore to be understood that the devices of Figures 1 to 3, inclusive, are for purposes of illustration only, and that other modifications will be apparent to those skilled in the art as falling within the scope of the invention as defined by the appended claims.

I claim:

1. The combination with a movable aircraft control surface, of a control means for actuating said surface, a vibration damper including a resiliently mounted mass located adjacent but independent of said surface, said mass having a period of vibration substantially equal to the natural period of vibration of said surface and means for transmitting the vibrations of said mass through said control means to said control surface in phase opposition to the vibrations of said surface.

2. The structure as claimed in claim 1, in which said vibration damper includes a means for changing the vibration frequency to which said damper is responsive.

3. In combination, a movable auxiliary surface for aircraft, a pair of cables each respectively operative to cause actuation of said surface in opposite directions, a vibration damper located adjacent said surface, said damper including a resiliently mounted mass having a period of vibration substantially equal to the natural period of vibration of said surface, a pivoted arm secured to said mass and actuated thereby and means for transmitting the vibratory movement of said mass through said arm alternately to each of said cables to thereby transmit the vibrations of said mass to said surface in phase opposition to the vibrations thereof.

4. In combination with a hinged aircraft control surface, control means for actuating said surface in each direction, a vibration damper including a resiliently mounted mass mounted independent of said surface and operative to vibrate in phase with said surface at the natural frequency of vibration thereof and phase shifting transmitting means interconnecting said mass and said control means for transmitting vibrations of said mass to said surface through said control means in phase opposition to the vibrations of said surface.

5. In combination, a pivoted auxiliary airfoil surface for an aircraft, a vibration damper comprising a resiliently mounted mass mounted adjacent to but operable independent of said surface, said mass having a period of vibration substantially equal to the natural period of vibration of said surface and means connected to said surface and associated with said mass for transmitting the vibrations of said mass to said surface in phase opposition to the vibrations of said surface.

6. In combination, a pivoted auxiliary airfoil surface for an aircraft, a vibration damper including a resiliently mounted mass having a period of vibration substantially equal to the natural period of vibration of said surface, said damper being mounted adjacent to said surface, a pair of cables each respectively operative to move said surface in opposite directions, a pair of guides associated with each of said cables, a pivoted arm connected at one end to said mass and means secured to the other end of said arm beyond the pivotal mounting thereof for respectively engaging said cables between said guides for alternately imparting a force thereto from said mass in phase opposition to the forces induced therein by vibration of said supporting surface.

PAUL H. KEMMER.